United States Patent [19]

Rogers et al.

[11] Patent Number: 4,639,016
[45] Date of Patent: Jan. 27, 1987

[54] PIPELINE REPAIR KIT

[75] Inventors: Russell L. Rogers, Munith; Neill D. Perrine; Richard M. Alexander, both of Jackson, all of Mich.

[73] Assignee: Aeroquip Corporation, Jackson, Mich.

[21] Appl. No.: 588,354

[22] Filed: Mar. 12, 1984

[51] Int. Cl.⁴ ............................................. F16L 27/00
[52] U.S. Cl. ..................................... 285/15; 285/31; 285/163; 285/168; 285/181; 285/184; 285/276
[58] Field of Search .............. 285/31, 181, 363, 368, 285/382, 15, 16, 17, 163, 168, 169, 184, 276; 405/170; 138/97; 29/402.8, 402.12, 402.14

[56] References Cited

U.S. PATENT DOCUMENTS

| Re. 19,132 | 4/1934 | McGuikk | 285/181 |
| Re. 22,713 | 1/1946 | Howe | 285/31 |
| 813,454 | 2/1906 | Schaad | 285/363 |
| 991,501 | 5/1911 | Graves | 285/181 |
| 1,246,091 | 11/1917 | Haller | 285/368 |
| 1,782,779 | 11/1930 | Fullman | 285/179 |
| 1,859,449 | 5/1932 | MacKenzie | 285/181 |
| 2,013,660 | 9/1935 | Lauer | 285/158 |
| 2,340,732 | 2/1944 | Bruno | 285/363 |
| 2,450,195 | 9/1948 | Grantham | 285/181 |
| 2,699,344 | 1/1955 | Bissell | 285/15 |
| 2,747,898 | 5/1956 | Wiltse | 285/368 |
| 2,749,151 | 6/1956 | Lyons | 285/276 |
| 2,757,023 | 7/1956 | Hein | 285/24 |
| 2,777,715 | 1/1957 | Beyer | 285/363 |
| 2,900,199 | 8/1959 | Logan | 285/363 |
| 3,658,366 | 4/1972 | Welch | 285/31 |
| 3,719,209 | 3/1973 | Rush et al. | 285/179 |
| 3,737,179 | 6/1973 | White, Jr. | 285/368 |
| 4,037,861 | 7/1977 | Medney | 285/181 |
| 4,041,720 | 8/1977 | Lebourg | 285/18 |
| 4,186,475 | 2/1980 | Jönsson | 285/31 |
| 4,303,261 | 12/1981 | Reddy | 285/31 |

FOREIGN PATENT DOCUMENTS

| 805469 | 5/1951 | Fed. Rep. of Germany | 285/184 |
| 1908878 | 9/1969 | Fed. Rep. of Germany | 285/382 |
| 1926402 | 12/1969 | Fed. Rep. of Germany | 285/184 |
| 143462 | 8/1980 | Fed. Rep. of Germany | 285/181 |
| 1155238 | 4/1958 | France | 285/31 |
| 455539 | 9/1950 | Italy | 285/181 |
| 117889 | 5/1958 | U.S.S.R. | 285/181 |

*Primary Examiner*—Cornelius J. Husar
*Assistant Examiner*—Eric K. Nicholson
*Attorney, Agent, or Firm*—Beaman & Beaman

[57] ABSTRACT

A system for repairing pipeline, such as underground fuel, gas or water pipeline systems which have been damaged by explosives, wherein the ruptured sections have been misaligned. Quick-connect fittings are attached to the misaligned pipe ends after trimming and a bridging conduit system is interposed between the fittings having adjustable portions for accommodating the misalignment. Rotative angular sections provide universal adjustment while retaining the fluid-tight integrity of the apparatus.

5 Claims, 5 Drawing Figures

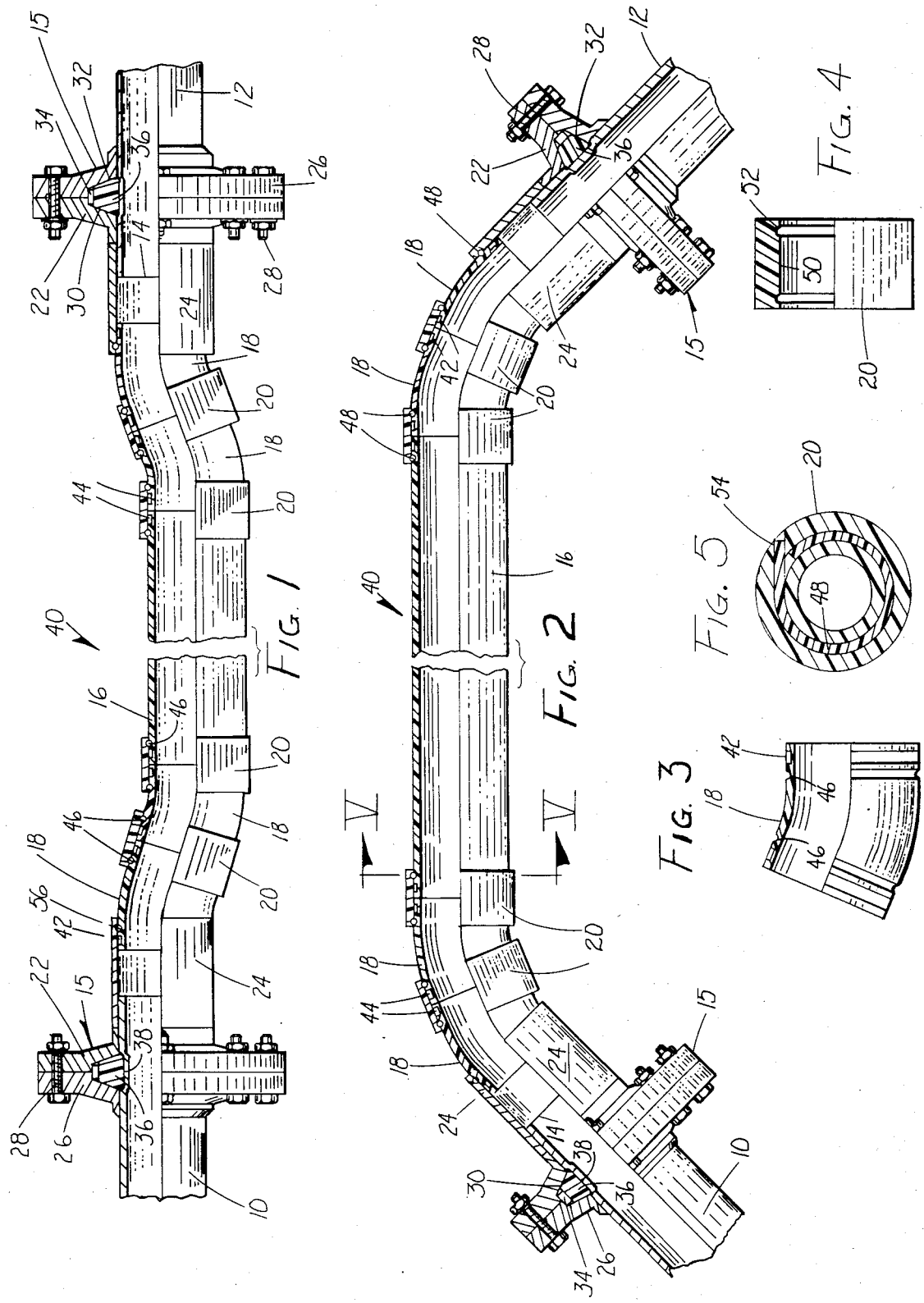

PIPELINE REPAIR KIT

BACKGROUND OF THE INVENTION

In airfields, for instance, it is common to bury fuel lines for supplying the aircraft, and such fuel lines will often be of high capacity, for instance, 8" diameter. In the event of an air attack such fuel lines may be damaged and portions of the pipeline severely bent and ruptured. Rapid repair of such fuel lines is of utmost importance.

It is an object of the invention to provide a pipeline repair system capable of quickly repairing large diameter conduits with rigid tubular inserts wherein such repair causes no restrictions to fluid flow, and may be used permanently.

Another object of the invention is to provide a pipeline repair system utilizing rigid conduit inserts wherein the configuration of the conduit system may be infinitely varied between wide limits to permit accommodation to the misaligned ends of the damaged pipeline.

A further object of the invention is to provide a pipeline repair system utilizing fittings attached to the damaged pipe wherein a strong mechanical connection to the damaged pipe is achieved having excellent sealing integrity, and which may be installed by average skilled workers.

An additional object of the invention is to provide a pipeline repair system rapidly adjustable to accommodate misaligned damaged pipe ends, and wherein the system includes a plurality of relatively rotatable interconnected inserts highly resistant to axial separation.

In the practice of the invention the damaged section of a ruptured pipeline is cut out and the pipe is trimmed to provide squared ends. A fitting is applied to each pipe end utilizing an axially displaceable flange which compresses an annular seal upon the damaged pipe mechanically affixing the fitting to the pipe in a fluid-tight relationship. The fitting includes an axially disposed extension extending beyond the end of the pipe.

The bridging conduit system inserts include a primary bridging conduit of a linear rigid configuration having angularly disposed elbow sections rotatively associated with the ends thereof. By rotation of the angle elbow sections a wide variety of angular relationships may be produced to align the ends of the bridging system with the fitting extensions for attachment thereto.

A sealing means in the form of couplings, seal rings and drive wires interconnect the components of the bridging system, and the bridging system with the fittings, wherein relative rotation between the components is possible for adjustment purposes, yet a fluid-tight system is produced. Adjustment between the components, and assembly of the components to the pipeline, is accomplished with non-skilled personnel, and by utilizing different lengths of primary bridging conduits a wide variety of pipeline breaks can be quickly repaired.

DESCRIPTION OF THE DRAWINGS

The aforementioned objects and advantages of the invention will be appreciated from the following description and accompanying drawings wherein:

FIG. 1 is an elevational view, partially sectioned, of a pipeline repair system in accord with the invention showing accommodation of the system to pipes having minor misalignment, FIG. 2 is an elevational, partially sectioned view of the pipeline repair system as installed upon severely misaligned pipe ends, FIG. 3 is an elevational view, partially sectioned, of an angle elbow, FIG. 4 is an elevational, partially sectioned view of a coupling as used with the invention, and FIG. 5 is an elevational, sectional view as taken along Section V—V of FIG. 2.

DESCRIPTION OF THE PREFERRED EMBODIMENT

In the drawings, the pipeline that has been damaged is represented by pipe sections 10 and 12. The pipe sections 10 and 12 of FIG. 1 are each provided with a squared end 14 which is a result of the pipe being trimmed prior to repair. The damaged pipe portion, not shown, has been cut away and discarded. In FIG. 1 the pipeline sections, 10 and 12 are only misaligned to a minor degree, while in FIG. 2 major misalignment has occurred, for instance, as a result of an explosion occurring below the pipe which would lift the same during rupture. The different degrees of misalignment illustrated in FIGS. 1 and 2 typifies situations of damaged pipe orientation which may be accommodated by the invention.

The pipeline repair system of the invention is furnished in the form of a kit which includes two pipe fittings 15 and a bridging conduit system which includes a plurality of conduit inserts such as a primary linear rigid bridging conduit 16, and four angle elbow fittings 18 plus four couplings 20. Several lengths of bridging conduits 16 may be included in the kit.

The identical fittings 15 each include a body having a radially extending collar 22 and a tubular extension 24 having a cylindrical inner surface. A flange 26 attaches to the collar 22 by a plurality of circumferentially spaced bolts 28, and the collar is provided with a conical surface 30 while the flange is formed with an axially opposed complementary conical surface 32 which, together, define the chamber 34 having sides which diverge in an inward direction.

An elastomeric ring 36 is received within the chamber 34, and preferably, the ring is formed of polyurethane.

The normal inner diameter of the ring 36 is substantially equal to the outer diameter of the pipe 10 or 12, and the fitting 15 may be inserted over the end of the pipe portion when the bolts 28 are unloosened. Upon the fitting 15 being oriented on the associated pipe section as shown in FIG. 1, wherein the extension 24 extends beyond the pipe end 14, the bolts 28 are tightened which compresses the tapered sides of the ring forcing the seal ring inwardly which will deform the pipe section inwardly to define a groove 38, and in this manner a firm mechanical connection of the fitting to the associated pipe section is achieved, as well as an excellent fluid-tight seal.

Upon measuring the distance separating the pipe ends 14, the installer assembles the appropriate conduit bridge system components. The bridge system 40 includes the primary rigid linear conduit 16, and a plurality of angle elbows 18 having an offset of approximately 20°. The conduit 16, and elbows 18, adjacent each end thereof are provided with an annular recess 42 for receiving an O-ring 44, and a semi-circular groove 46 for receiving the drive pin 48, FIG. 5.

A cylindrical coupling 20 is associated with adjacent elbows and the primary bridge conduit, and the coupling includes an inner cylindrical surface 50 for engagement by the O-rings 44, and also includes the outer portion of the drive pin groove 52. The couplings are provided with a tangential hole 54 whereby the drive pin 48 may be inserted when the grooves 46 and 52 of the coupling and conduits are aligned.

Likewise, the fitting extensions 24 are provided with a drive pin groove 56 and tangential hole, not shown.

The bridging system conduit and elbows are assembled by locating the O-rings 44 within the recesses 42 and the couplings are placed upon the components such that an end-to-end abutting relationship between the conduit and elbows permits the couplings to be positioned to align with the drive pin grooves of the conduit and elbow permitting insertion of the nylon drive pins 48 to permanently interconnect adjacent conduits and elbows. This interconnection permits relative rotative movement between adjacent components, but prevents axial displacement therebetween.

To permit assembly of the system to the pipeline several sequences of assembly may be used. For instance, the entire repair assembly may be assembled prior to the fittings 15 being tightened onto pipe portions. The extensions 24 are of great enough length so that one fitting 15 may be inserted on a pipe section 10 or 12 a sufficient distance to permit the other fitting 15 to be aligned with its adjacent pipe section and then the assembly moved in the opposite direction to place the second fitting upon its pipe section. Thereupon, the bolts 28 are tightened to compress the seal rings 36 upon the encircled pipe section. Another mode of assembly is to initially place the fittings 15 upon their associated pipe section, but not insert the drive pin 48 into one of the couplings 20 associated with the primary linear bridging conduit 16. The "loose" coupling is merely placed upon the conduit 16, and the uncoupled conduit end is aligned with the adjacent elbow end. Upon alignment taking place due to transverse movement of the conduit or elbow, the coupling 20 is slipped over the elbow end, the drive pin grooves aligned and the drive pin inserted to complete the assembly.

As a pair of angle elbows 18 are usually employed at each end of conduit 16 the relative rotative adjustment of the elbows permits a wide variety of angular relationships to be achieved, and the utilization of four angle elbows permits practically all pipeline breaks to be repaired. Merely by rotating the elbows an infinite number of angular relationships can be achieved and accurate alignment with misaligned pipe sections 10 and 12 is readily accomplished without requiring special skills.

The conduit 16, the angle elbows 18 and couplings 20 may be formed of synthetic plastic or metal, the repair of the pipeline is of a permanent nature, and the repair components can be buried, if desired. Repair of a pipeline with the apparatus of the invention produces no restrictions to fluid flow, and only average skills are required for installation.

It is appreciated that various modifications to the inventive concepts may be apparent to those skilled in the art without departing from the spirit and scope of the invention.

We claim:

1. A pipeline repair system for interconnecting the spaced and misaligned ends of a ruptured pipeline having a cylindrical exterior surface comprising, in combination, a pair of tubular pipeline fittings each having compression sealing means for producing a sealing connection to the exterior cylindrical surface of a pipeline end and a tubular cylindrical extension for extending beyond the associated pipeline end, a primary rigid linear bridging conduit having cylindrical ends located between said fittings, a pair of angle conduits having cylindrical ends located adjacent each end of said bridging conduit and adjacent a pipeline fitting, each of said angle conduits having an outer cylindrical end and an inner cylindrical end, the axes of said cylindrical ends of an angle conduit intersecting and being angularly offset relative to each other, first rotatable sealing means sealing said inner cylindrical ends of an associated pair of angle conduits in rotatable aligned relationship whereby relative rotation of the associated angle conduits changes the angular relationship of said outer cylindrical ends of the associated angle conduits, second rotatable sealing means defined upon said ends of said bridging conduit rotatably sealing an outer end of each pair of associated angle conduits in communication therewith, and third rotatable sealing means rotatably sealing the other outer end of each pair of associated angle conduits to a pipeline fitting extension in communication therewith to establish sealed communication between the pipeline ends, said sealing means each including annular rotatable locking means interposed between the associated angle conduits, the associated bridging and angle conduits and the associated angle conduits and pipeline fitting extensions permitting relative rotation therebetween and preventing relative axial displacement thereof.

2. In a pipeline repair system as in claim 1, said first and second rotatable sealing means including tubular couplings having internal cylindrical surfaces, and seal rings interposed between said couplings and the associated angle conduit inner ends and the associated bridging and angle conduit outer ends.

3. In a pipeline repair system as in claim 2, said annular rotatable locking means interposed between the associated couplings, bridging and angular conduits and fitting extensions preventing relative axial displacement thereof comprising aligned annular grooves defined in said couplings, bridging and annular conduits and fitting extensions, and a drive pin tangentially inserted into said aligned grooves conforming to the annular configuration thereof.

4. In a pipeline repair system as in claim 1, said axes of said inner and outer cylindrical ends of a common angle conduit being offset approximately 20°.

5. In a pipeline repair system as in claim 3, said drive pins being formed of a synthetic plastic material.

* * * * *